No. 652,952. Patented July 3, 1900.
E. M. & M. N. ANDREWS & C. M. CONGER.
MAGNETO ELECTRIC MOTOR.
(Application filed May 10, 1900.)

(No Model.)

Witnesses
F. C. Stuart
L. E. Powers

Inventors
E. M. Andrews.
M. N. Andrews.
C. M. Conger.
by J. Ralph Orwig. Atty.

UNITED STATES PATENT OFFICE.

EVERETT M. ANDREWS AND MELVIN N. ANDREWS, OF DES MOINES, AND CHARLES M. CONGER, OF ADEL, IOWA.

MAGNETO-ELECTRIC MOTOR.

SPECIFICATION forming part of Letters Patent No. 652,952, dated July 3, 1900.

Application filed May 10, 1900. Serial No. 16,175. (No model.)

*To all whom it may concern:*

Be it known that we, EVERETT M. ANDREWS and MELVIN N. ANDREWS, residing at Des Moines, in the county of Polk, and CHARLES M. CONGER, residing at Adel, in the county of Dallas, State of Iowa, citizens of the United States, have invented certain new and useful Improvements in Magneto-Electric Motors, of which the following is a specification.

The objects of this invention are to provide a motor of this class of simple, durable, and inexpensive construction in which a maximum efficiency is attained for operating the motor from an electric current of given quantity; further, to provide a magnetic field so constructed that practically all of its force is utilized in driving the armature and almost none permitted to escape or be lost by passing through the air between the poles, and, further, to provide a field so constructed that the power of the magnets is retained in them for a maximum length of time, such as would be the case where a "keeper" was provided for a permanent magnet.

Our invention consists, essentially, in the construction and arrangement of a permanent magnetic field in which the poles are directly connected to form a continuous circuit through the field and to completely encircle the armature and in the combination therewith of a rotating armature and accompanying parts of a motor, whereby the objects contemplated are attained, as hereinafter more fully set forth, pointed out in our claims, and illustrated in the accompanying drawings, in which—

Figure 1:
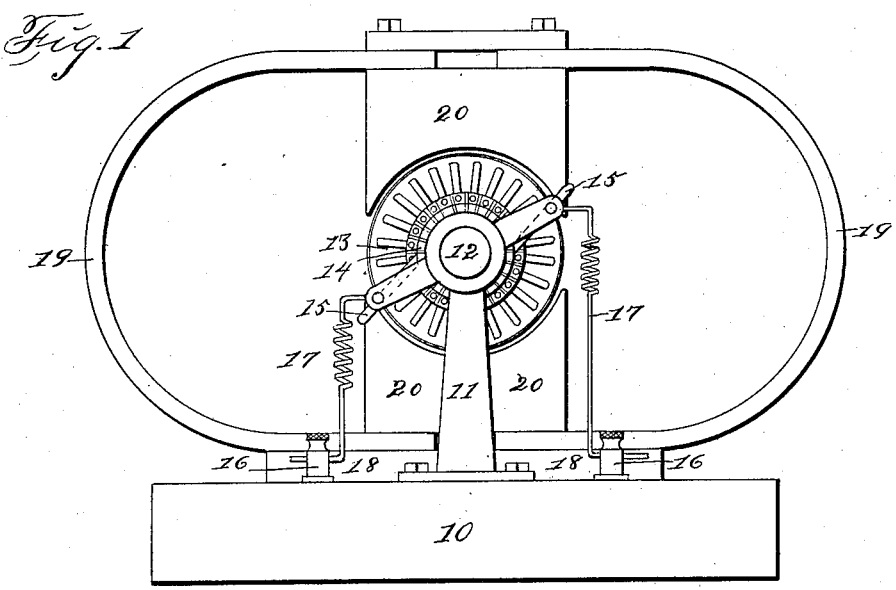
Figure 2:
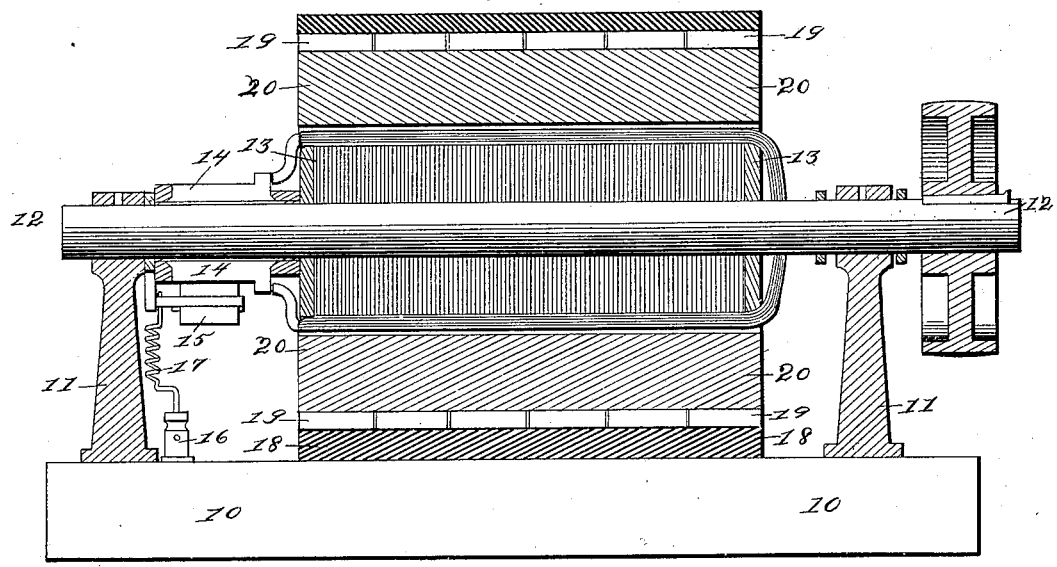

Figure 1 shows an end elevation of the complete motor. Fig. 2 shows a vertical central longitudinal sectional view of same.

Referring to the accompanying drawings, we have used the reference-numeral 10 to indicate the base of the machine. This base is composed of insulating material, so as to prevent the escape of the magnetic force from the magnets. Mounted upon the base are the uprights 11, of ordinary construction, supporting a rotatable shaft 12. Mounted upon the central portion of the shaft is an armature (indicated by the reference-numeral 13) and wound in the ordinary manner. At one end of the armature is a commutator 14, also of ordinary construction. Supported adjacent to the commutator are two brushes 15 in electrical contact with the commutator. The binding-posts 16 are attached to the base, and the wires 17 connect them with the brushes.

Upon the central portion of the base we have mounted a block of insulating material 18, and fixed to this block are two series of permanent horseshoe-magnets 19, which are preferably separated from each other in each series, and the ends of the magnets are brought approximately together on field-pieces which are directly under and above the center of the shaft, the positive poles of one series of magnets being arranged adjacent to the negative poles of the opposite series. The adjacent ends of the magnets are connected by means of the field-pieces 20, the surfaces of said field-pieces adjacent to the armature being concave to conform to the contour of the armature, and said field-pieces are of a length corresponding to the length of the armature.

In practical use it has been found that by constructing the field in the manner shown and described a current of electricity of given quantity passed through the armature will cause the shaft to be rotated with a speed and power considerably in excess of the speed and power that would be attained if all of the magnets were placed on one side of the motor and the poles of the magnets disconnected.

We are aware that electric generators have been used heretofore in which a field was made of permanent magnets; but we are not aware that permanent field-magnets have ever been arranged in a continuous circuit in the manner shown and described, and the greatly-increased efficiency of our machine over that of the ordinary motor having an electromagnetic field is due to the arrangement of the permanent magnets in a complete circuit, with their poles magnetically connected.

We claim as our invention—

1. In a magneto-electric motor, the combination of two or more series of permanent magnets, arranged to encircle the armature, and having the opposite poles of the adjacent series of magnets, magnetically connected.

2. In a magneto-electric motor, the combination of two or more series of permanent magnets arranged to encircle the armature, having the opposite poles of the adjacent series of magnets magnetically connected, and means for insulating said magnets from the base.

3. In a magneto-electric motor, the combination of a base made of insulated material, two series of horseshoe-magnets supported above the base, arranged in a complete circuit around the armature, and having the positive poles of one series adjacent to the negative poles of the other series, and field-pieces with their inner surfaces concave to conform to the contour of the armature magnetically connected with the adjacent poles of the magnets, substantially as, and for the purposes stated.

EVERETT M. ANDREWS.
MELVIN N. ANDREWS.
CHARLES M. CONGER.

Witnesses:
ALEXANDER FITZHUGH,
J. RALPH ORWIG.